2,974,084
Patented Mar. 7, 1961

2,974,084

α-HALOGENATED-γ-BUTYROLACTONES AS NEMATOCIDES

Raymond L. Mayhew, Phillipsburg, N.J., and Earl P. Williams, Pen Argyl, Pa., assignors to General Aniline & Film Corporation, New York, N.Y., a corporation of Delaware No Drawing. Filed Mar. 6, 1958, Ser. No. 719,521

5 Claims. (Cl. 167—33)

This invention relates to new nematocidal compositions and to a process of applying the same.

Various organic compounds are currently employed in the control and eradication of nematodes. The vapors of a majority of these compounds are toxic to nematodes in extremely low concentrations. For soil fumigation, chloropicrin has been found to be an efficient fumigant. Since chloropicrin forms a gas and is extremely toxic to plants in both the soil and the air, its use as a soil fumigant has been largely discontinued. From previous experience, it has been found that under certain weather conditions a blanket of chloropicrin gas may collect over a fumigated bed near the ground, then drift slowly over a nearby area and cause severe injury to various plants growing there, especially at night when the foliage is covered with dew.

D-D which is a mixture of 1,3-dichloropropylene and 1,2-dichloropropane obtained as a by-product in the manufacture of allyl alcohol from petroleum is inflammable and is dangerous to use in enclosed space in the presence of sparks or open flame. It is dangerous to humans. Prolonged breathing of its vapors may cause the symptoms associated with the inhalation of the vapors of chlorinated hydrocarbons. It is very dangerous if spilled on the skin, shoes or clothing, and is likely to cause irritation, a burning sensation, and blistering. Such mixture is apt to cause injury to plants, and is, therefore, used almost entirely before planting.

It is an object of the present invention to provide a new nematocidal composition which is not toxic within certain limits of concentration to plants and warm blooded animals.

Another object is to provide compositions comprising α-halogenated-γ-butyrolactones as nematocides.

A still further object is to provide an improved method of protecting plant materials subject to attack by nematodes by treating the loci of said nematodes with α-halogenated-γ-butyrolactones.

Other objects and advantages will become more clearly manifest from the following description.

We have found that compounds having the following general formula:

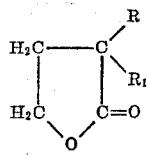

wherein R represents either hydrogen or chlorine, and $R_1$ represents chlorine or bromine, are readily effective as nematocides when applied in the form of aqueous emulsions, dispersions or in solution of a liquid petroleum hydrocarbon. The α-halogenated-γ-butyrolactones are substantially non-toxic when accidently spilled on the skin and substantially non-toxic, within limits of certain concentration to plants and warm blooded animals. In addition, the α-halogenated-γ-butyrolactones are colorless to slightly yellowish liquids which can be readily employed without the need of special handling precautions in view of their complete emulsifiability in water and solubility in certain liquid hydrocarbons. They can be diluted for immediate use either in the field or greenhouse.

The α-halogenated-γ-butyrolactones contemplated by the foregoing general formula are the following:

α-chloro-γ-butyrolactone
α-bromo-γ-butyrolactone
α,α-dichloro-γ-butyrolactone

The α-chloro- and the α,α-dichloro-γ-butyrolactones are known compounds and readily prepared according to the procedures given in P.B. Report 610 and Liebig's Annalen Chem., 596, 1955.

The α-bromo-γ-butyrolactone is prepared according to the procedure given in J. Amer. Chem. Soc., 67, 2218–20 (1945), and by the following method:

A mixture of 510 grams (5 moles) of γ-butyrolactone and 10 cc. of phosphorous tribromide were placed in 1 liter round bottomed flask equipped with a stirrer, thermometer, reflux condenser and a dropping funnel extending below the surface of the solution. Heating was instituted and when the temperature reached 100° C. the addition of bromine was initiated. A total of 760 grams of bromine was added over a period of four hours while maintaining a temperature of 100–120° C. After heating for an additional four hours at 120° C. the crude material was distilled in vacuo. Yield 640 grams or 80% of theory of α-bromo-γ-butyrolactone, boiling point 130–132° C. at 8 mm.

The most outstanding characteristics of the foregoing α-halogenated-γ-butyrolactones are (1) their deep penetration into the soil when used with a liquid carrier, (2) lower vapor pressure, thus allowing soil fumigation to proceed over a longer period and provide for the retention of the toxic concentration in the soil, and (3) in aqueous emulsions or dispersions, concentrations as high as 10% by weight are relatively non-toxic to warm blooded animals and plants in general. As noted above, if accidently spilled on skin or clothing, there will be no injury to the skin. Either the aqueous emulsion or dispersion or a solution in a liquid hydrocarbon is merely sprayed on the soil in a concentration of .001 to 20% by weight and hosed in with water or rain and allowed to penetrate the lower layers of the soil.

The amount of either one of the foregoing α-halogenated-γ-butyrolactones that is to be employed in the control and eradication of soil nematodes is not critical and the precise or actual amount to be employed, depending upon whether the application is to be made in the field, greenhouse, flats or pots is readily determined by routine experiments. For open fields, from 50 to 400 pounds per acre may be used in either emulsified, dispersed or solution form in a liquid hydrocarbon. As little as .001% by weight of the α-halogenated-γ-butyrolactone in solution of a liquid hydrocarbon or emulsified or dispersed in water is sufficient to control several species of soil nematodes. Emulsions or dispersions are readily prepared by first adding to the α-halogenated-γ-butyrolactone any commercially available emulsifier such as alkylphenoxypolyethoxyethanol, fatty acid polyoxyethylene glycol ester ethers, fatty amide polyoxyethylene glycol adducts, fatty alcohol polyoxyethylene glycol ethers, etc. and then adding this mixture slowly to water with continued stirring until an emulsion or dispersion is obtained. Solutions in liquid hydrocarbons are readily prepared by merely dissolving the α-halogenated-γ-butyrolactone in any of the commercially available liquid hydrocarbon fractions such as straight chain hydrocarbons, naphthas, deodorized kerosene and the currently available liquid hydrocarbon solvent-diluents sold under the brand name of Soltrols, Velsicols, Solvessos, Sovacide and mixtures of these. Liquid hydrocarbon solutions can be readily prepared which will contain in solution the α-halogenated-γ-butyrolactone on a weight basis ranging from 0.001 to 20%, preferably 1 to 15%.

Aqueous emulsions and dispersions are preferred when it is desired to drench soil such as in greenhouse benches and the like. The α-halogenated-γ-butyrolactones can also be employed in admixture with a solid carrier such as talc, clay, vermiculite or the usual soil amendments such as limestone, fertilizers, etc.

The α-halogenated-γ-butyrolactones may be injected either in concentrated form in emulsion or in solution directly into the soil in controlled amounts by the usual method. They can also be applied in granular form (absorbed by an inert carrier such as clay, vermiculite, etc.) and applied broadcast or in rows.

The following examples will illustrate the manner in which the nematocidal compositions of the present invention may be employed in the control and eradication of destructive nematodes.

*Example I*

In screening each of the above listed α-halogenated-γ-butyrolactones as nematocides, the following method was employed:

Quadruplicate 100 gram samples of dry sand were mixed with 5 gram samples of a brei of tomato roots infested with root-knot nematodes, *Meloidogyne incognita*. The brei was prepared by cutting tomato roots of infested plants into quarter inch lengths, then further macerating in a Waring Blendor for 1 minute. The sand and the brei were mechanically mixed with shaking 1 minute in a closed Mason jar. The mixture was transferred to 2½ inch clay pots at which time 50 mg. of test chemical was added to the mixture. Each pot was then wrapped in Saran and allowed to stand for 24 hours.

The mixture was then transferred to stainless steel cylinder screens, approximately 2½ inches high and 3½ inches in diameter. The screen material was 100 mesh stainless steel wire cloth. These screens were placed in the bottom half of a 9 cm. Petri dish containing 25 ml. of water and covered with the Petri dish cover. In a short time an additional 10 ml. of distilled water were added to each plate in order that free water would be available in the dish. After 24 hours microscopic counts of ten fields were made of the living nematodes which had migrated through the screen and into the Petri dish. Comparisons were made with untreated control dishes.

| α-Halogenated-γ-butyrolactone | Rate in Milligrams | Fields Examined | Average Nematode Count, Total Living | Average Nematode Count, Total Dead |
|---|---|---|---|---|
| α-chloro-γ-butyrolactone | 50 | 10 | 5 | 25 |
| α-bromo-γ-butyrolactone | 50 | 10 | 6 | 30 |
| α,α-dichloro-γ-butyrolactone | 50 | 10 | 5 | 27 |
| Blank | | 10 | 100 | 75 |

*Example II*

A quantity of sandy loam was contaminated with chopped tomato roots containing *Meloidogyne incognita* and thoroughly mixed to insure even distribution of the inoculum. 5 separate samples of the inoculated soil were placed in pint Mason jars and the appropriate amount of each of the α-halogenated-γ-butyrolactones introduced into each of the first 4 jars leaving 1 jar as a blank, after which the jars were stored at room temperature overnight. The soil was then introduced from each of the jars into 4 separate 4" clay pots. Seeds of Cucumis sativus variety Market Canner's were planted and the 4 pots placed in a greenhouse and watered regularly together with the blank pot. Approximately 30–60 days after the original seeding, all plants were harvested and the roots examined, with the following observations:

| α-Halogenated-γ-butyrolactone | Dosage | Observation |
|---|---|---|
| α-chloro-γ-butyrolactone | 50 milligrams per 100 grams of soil. | no galls, plant healthy, heavy root system. |
| α-bromo-γ-butyrolactone | do | Do. |
| α,α-dichloro-γ-butyrolactone | do | Do. |
| Blank | | 25 galls, plant sickly looking, poor root system. |

In addition to the foregoing screening test, satisfactory results were obtained, while employing each of the foregoing α-halogenated-γ-butyrolactones in the control of cyst-forming nematodes, endoparasitic nematodes, ectoparasitic nematodes and background feeders such as *Aphelenchoides ritzemabosi* on the following vegetables and small fruits:

| | | |
|---|---|---|
| Asparagus | Cauliflower | Pea |
| Bean, lima | Celery | Radish |
| Bean, snap | Corn, sweet | Spinach |
| Broccoli | Cucumber | Squash |
| Brussel sprout | Eggplant | Strawberry |
| Cabbage | Lettuce | Tomato |
| Cantaloupe | Okra | Turnip |
| Carrot | Parsnip | Watermelon |

We claim:

1. A method for controlling soil nematodes which comprises contacting said nematodes with a fumigating amount of an α-halogenated-γ-butyrolactone having the following general formula:

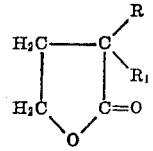

wherein R represents a member selected from the class consisting of hydrogen and chlorine, and $R_1$ represents a member from the class consisting of chlorine and bromine.

2. A process of eradicating nematodes from the soil and minimizing the attack thereby on plants, which comprises introducing to the soil a nematocidal amount of an α-halogenated-γ-butyrolactone having the following general formula:

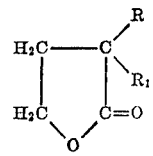

wherein R represents a member selected from the class consisting of hydrogen and chlorine, and $R_1$ represents a member from the class consisting of chlorine and bromine.

3. The process according to claim 2 in which the α-halogenated-γ-butyrolactone is α-chloro-γ-butyrolactone.

4. The process according to claim 2 in which the α-halogenated-γ-butyrolactone is α-bromo-γ-butyrolactone.

5. The process according to claim 2 in which the α-halogenated-γ-butyrolactone is α,α-dichloro-γ-butyrolactone.

(References on following page)

References Cited in the file of this patent

UNITED STATES PATENTS

| | | |
|---|---|---|
| 2,530,348 | Britton et al. | Nov. 14, 1950 |
| 2,714,619 | Anderegg et al. | Aug. 2, 1955 |

OTHER REFERENCES

Sollman: J. of Pharmacology and Exptl. Ther., vol. XII, No. 3, pp. 129–170 (pp. 129–131 relied on).

Baldwin: Brit. J. Pharmacol., vol. 3, pp. 91–106 (pp. 91–93 relied on).

Chem. Abst., vol. 24, p. 1156, 1930.

Chem. Abst., vol. 39, p. 4153, 1945.

Haynes: Quarterly Reviews, vol. II, pp. 46–72, 1948 (pp. 67–72 relied on).

Paranjope et al.: J. Univ. Bombay, vol. XI, part 5, pp. 104–110, March 1943.